Patented Aug. 7, 1934

1,969,044

UNITED STATES PATENT OFFICE 1,969,044

DYESTUFF OF THE ANTHRAQUINONE SERIES AND PROCESS OF PREPARING THE SAME

Cecil Shaw, George Crowe Semple, and Robert Fraser Thomson, Grangemouth, Scotland, assignors to Imperial Chemical Industries Limited, a corporation of Great Britain No Drawing. Application April 11, 1932, Serial No. 604,654. In Great Britain April 14, 1931

3 Claims. (Cl. 260—57)

This invention relates to the manufacture and production of intermediates for dyestuffs of the anthraquinone series.

More particularly, this invention relates to a new and improved process for the production of 1,4,5,8-tetra-halogen-anthraquinone.

It is an object of this invention to provide a process for the manufacture of 1,4,5,8-tetra-halogen-anthraquinone in economical manner by starting with relatively inexpensive and readily available initial material.

Other and further important objects of this invention will appear as the description proceeds.

1,4,5,8-tetrachloro-anthraquinone has been prepared in the art by direct chlorination of anthraquinone or a lower chlorination derivative thereof in a medium of concentrated sulfuric acid or oleum. (German Patent No. 228,901).

We have now found that 1,4,5,8-tetrahalogen-anthraquinones may be obtained in high yield and exceptionally pure form by reacting with halogen upon an alpha, alpha-dinitro-alpha, alpha-dihalogen-anthraquinone, which in turn may be obtained by nitrating 1,5- or 1,8-dihalogen-anthraquinone. This process is applicable to the production of a unitary tetrahalogen anthraquinone such as tetra-chloro-anthraquinone, as well as of a mixed tetrahalogen-anthraquinone, such as dibromo-dichloro-anthraquinone.

Thus, according to our invention, 1,4,5,8-tetrachloro-anthraquinone may be obtained by the action of chlorine on the alpha, alpha-dichloro-alpha, alpha-dinitro-anthraquinone made by nitrating 1,5- or 1,8-dichloro-anthraquinone with nitric acid in a medium of concentrated sulphuric acid. This step has the advantage of giving high yields of substantially pure 1,4,5,8-tetrachloro-anthraquinone.

The following examples, in which the parts are by weight, will serve to illustrate our invention. It will be understood, however, that our invention is not limited to the precise details set forth.

*Example 1*

The preparation of tetra-chloro-anthraquinone from 1,5-dichloro-dinitro-anthraquinone is described, the 1,5-dichloro-dinitro-anthraquinone being obtained by nitrating 1,5-dichloro-anthraquinone with nitric acid in a medium of sulphuric acid.

200 parts of this dichloro-dinitro-body and 100 parts of phthalic anhydride are mixed and melted together; the temperature is raised to 240° C., and a stream of chlorine is blown in. Brown fumes are evolved and the passing in of the chlorine is continued at this temperature until this evolution ceases, and then for a further half hour. The melt is allowed to cool somewhat, poured out and allowed to solidify. The solid product is ground; the phthalic anhydride is extracted with boiling water; and the residue is thoroughly washed and dried. It consists of 1,4,5,8-tetrachloro-anthraquinone.

Instead of the 1,5-dichloro-dinitro-anthraquinone in Example 1, 1,8-dichloro-dinitro-anthraquinone may be used. This can be obtained from 1,8-dichloro-anthraquinone by nitrating with nitric acid in a medium of sulphuric acid.

*Example 2*

In this example a mixed halogen derivative containing both bromine and chlorine is prepared.

600 parts of phthalic anhydride are melted and 100 parts of 1,5-dichloro-4,8-dinitro-anthraquinone added, and the temperature raised to 240° C. Bromine vapour is passed through the mass at this temperature, samples being withdrawn and analyzed, until a tetra-halogen derivative is obtained. The time of reaction depends upon the rate of supply of bromine, but a convenient time is about 18 hours. The product is isolated by pouring out, allowing to cool, grinding, extracting with boiling water and drying, the resulting product being a yellow powder.

Many variations and modifications are possible in our preferred procedure without departing from the spirit of this invention.

Having now particularly described and ascertained the nature of our said invention and in what manner the same is to be performed, we declare that what we claim is:

1. The process of preparing 1,4,5,8-tetrahalogen-anthraquinone, which comprises reacting with halogen upon an alpha, alpha-dinitro-alpha, alpha-dihalogen-anthraquinone.

2. The process of preparing 1,4,5,8-tetrachloro-anthraquinone, which comprises reacting with chlorine upon an alpha, alpha-dinitro-alpha, alpha-dichloro-anthraquinone.

3. The process of preparing alpha, alpha-dibromo - alpha, alpha - dichloro - anthraquinone, which comprises reacting with bromine upon alpha, alpha-dichloro-alpha, alpha-dinitro-anthraquinone.

CECIL SHAW.
GEORGE CROWE SEMPLE.
ROBERT FRASER THOMSON.